Dec. 30, 1969   FRANK O'DONNELL   3,486,944
ALSO KNOW AS FRANCIS O'DONNELL ET AL
BATTERY WITH RESERVE CELL
Filed Dec. 7, 1967

INVENTORS
FRANK O'DONNELL
GEORGE SCOCCA JR
BY
*Edward Halle*
ATTORNEY

United States Patent Office 3,486,944
Patented Dec. 30, 1969

3,486,944
BATTERY WITH RESERVE CELL
Frank O'Donnell (also known as Francis O'Donnell), 56 Glen Cove Road, Glen Head, N.Y. 11545, and George Scocca, Jr., 7 Chassyl Road, Commack, N.Y. 11725
Filed Dec. 7, 1967, Ser. No. 688,745
Int. Cl. H01m 21/00, 5/00, 1/00
U.S. Cl. 136—110      5 Claims

ABSTRACT OF THE DISCLOSURE

This invention relates to an electric battery with an active cell and a reserve cell, said cells each having contact electrodes extending therefrom in opposite directions, in which the reserve cell forms a part of the battery which also comprises a terminal spacer conductor means in the form of an end cap which is adapted to fit over either the first or the second of the said extending contact electrodes for the purpose of keeping said covered electrode spaced away from contact and out of the circuit. The battery is used like an ordinary dry cell in a flashlight or other installation, and when the active cell runs down, the terminal spacer conductor means cap is removed from the terminal which it covers and placed on the end of the battery comprising the run down terminal. The battery is then replaced in the flashlight or other device with a fresh portion in active position in the circuit.

---

The use of cells in various devices such as flashlights, radios, flashlight cameras and in other similar devices is well known. At the outset, the term "cell" is meant to cover any battery cell, whether a true dry cell or not, which is in the standard shape and form of the usual battery cell used in flashlights, radios and other devices. This is meant to include the usual dry cell, mercury cell, and any other type of cell which is placed, either singly or in series, or in parallel, or in series parallel, in a device with its electrodes contacting portions of the device to provide a source of electric power for the device such as a flashlight, radio and the like. The flashlight and radio devices are shown as examples only, it being understood that there are numerous devices which work by means of electricity supplied by battery cells inserted and held against contacts.

Standard cells come in various sizes, and are commonly designated in the trade as pen-light batteries, transistor batteries, C batteries, D batteries and other types of standard sizes and shapes. Some of these batteries may be flat, some may be rectangular, and most of them are cylindrical. They are used for many purposes as set forth hereinbelow.

It is an object of this invention to provide a battery with a reserve cell and an active cell together with other component parts which, when assembled, will be of the same size and shape of a standard battery cell and may be used in the same manner and then adjusted so that the reserve cell can be placed in the active position of the battery when the original active cell is run down.

Other objects and advantages of the invention will appear in the specification hereinbelow. The invention is illustrated in the accompanying drawings in which.

Similar numerals refer to similar parts throughout the several views.

Figure 4:
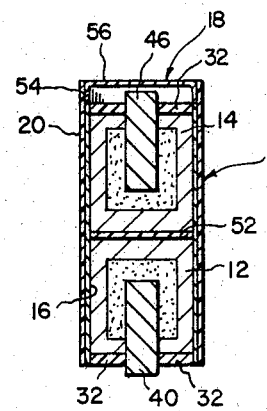
FIG. 4 is a medial cross sectional view of the invention in the normally inverted position.
Figure 5:
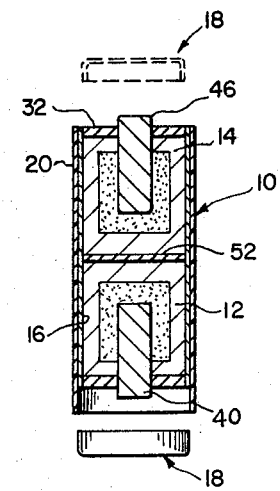
FIG. 5 is a cross sectional view of the invention in a normally upright position showing the terminal spacer conductor means in one portion in phantom and in another portion in exploded relationship.

The battery 10 of the invention comprises a set of cells 12 and 14. The cells 12 and 14 may be separate cells as shown in FIG. 2, or they may be contained in one casing 16 as shown in FIGS. 4 and 5. The battery 10 also comprises terminal spacer conductor means 18, and there is some means to hold the elements together such as a perimeter material 20 which in the case of a usual cell would be a paper or plastic insulating material fitted around the battery elements. These battery elements are assembled in the size and shape of a standard cell which is represented by the prior art cell shown in FIG. 1 of the drawings.

The prior art cell 22 is the usual type of cell for installation in flashlights, radios or the like, and is representative of any standard size of such cell. The prior art cell usually comprises a casing 24 having a side wall portion 26 and an end wall or bottom portion 28. Prior art cell 22 also has a contact terminal electrode 30 extending upwardly, or outwardly from the body of the cell. There is insulation material in the area designated by reference numeral 32 to insulate the contact terminal electrode 30 from the casing 24 of which at least a portion, usually the end wall or bottom 28, comprises the electrode of the cell of opposite polarity to the contact electrode 30. Thus, a series of cells can be placed end to end with contact electrodes 30 in contact with end wall or bottom 28 to form a multi-cell battery when placed against the proper contacts of a device such as a flashlight or a radio, or within any battery casing adapted to receive such cells. There is usually also a perimeter insulating material 34 covering all exposed portions of the casing 24 except the bottom 28 so that the cell can be insulated when installed for its intended purpose.

Figure 3:
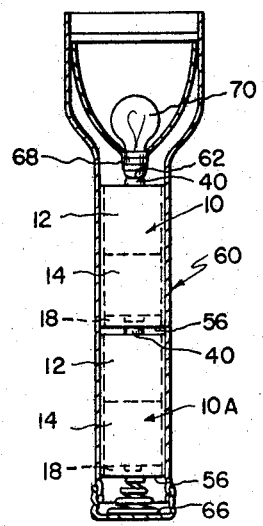
FIG. 3 is a sectional view of a flashlight showing the invention installed with parts in phantom.
Figure 1:
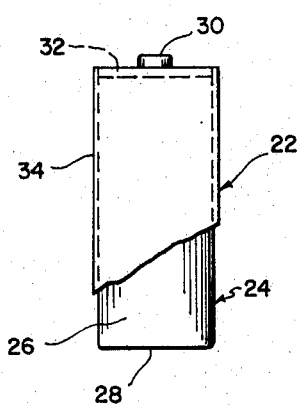
FIG. 1 is a representation of the prior art with parts cut away.
Figure 2:
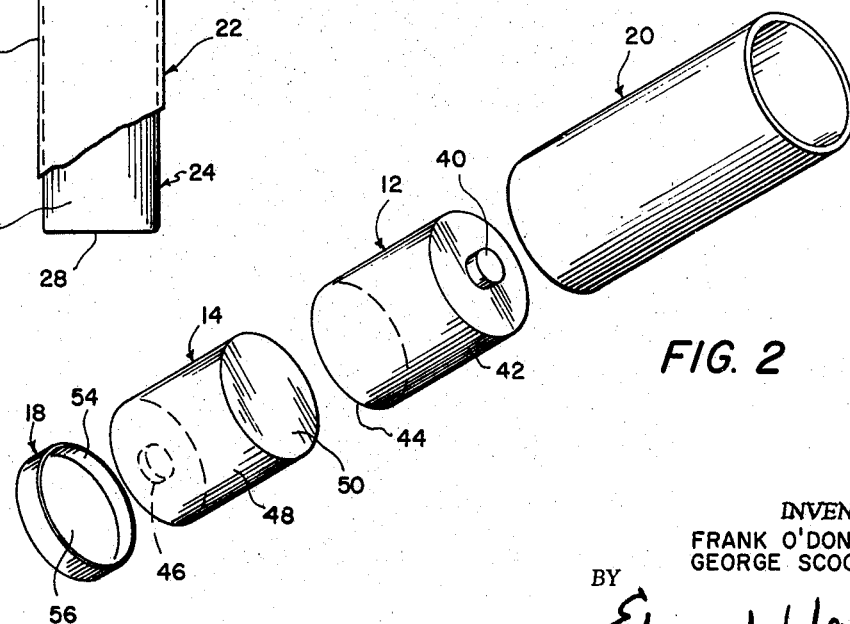
FIG. 2 is an exploded perspective view of the invention.

For the sake of clarity, the cell of FIG. 1 as well as the cells of the invention may be referred to as having a top or a bottom or sides, it being understood that the relative terms "top" and "bottom," "upper" or "lower" or "side" is meant to refer to such a cell or battery when in the position as shown in either FIGS. 1, 3 or 5. It is, of course, understood that such batteries may be used in any position, and the relative terms "top" and "bottom" would be applied to the upper and lower portions respectively of the battery shown in FIG. 4. In other words, the word "top" would ordinarily refer to that portion of the battery in which the contact electrode such as electrode 30 extends, and the word "bottom" would ordinarily refer to the other end of such cell or battery.

For purposes of illustration only, we show the batteries 10 of the invention installed in a flashlight as shown in FIG. 3, it being understood, of course, that the batteries could be shown installed in a radio or in any other device.

Each battery of the invention comprises a cell portion 12 which is designated originally as the "active" cell. Each cell portion 12 comprises a contact terminal electrode 40, at least one side wall 42, and an end wall or bottom portion 44. Each cell portion 14 designated as the "reserve" portion originally comprises a contact terminal electrode 46, at least one side wall 48, and end wall or bottom portion 50. The cells or cell portions 12 or 14 may be in the form of cells in separate casings 42 and 48 as shown in FIG. 2, or they may be in a single casing 16 as shown in FIGS. 4 and 5.

In this preferred form of the invention illustrated, the cell casings are adapted to fit within a perimeter material such as insulating material 20. In the form of cells shown in FIG. 2, the bottoms 44 and 50 are in facing abutting relationship when fitted within the perimeter material 20, and with the cells in integral casing 16 as shown in FIGS.

4 and 5, there may be a partition 52 dividing the cells 12 and 14.

Terminal spacer conductor means 18 may also comprise a side wall 54 and an end wall or bottom portion 56. The side wall 54 should be of a size to fit within the perimeter spacer means 20 in alignment with the cells 12 and 14. Thus, when the battery is assembled as shown in FIG. 4, the active or top cell 12 will have its terminal electrode 40 extending upwardly at the top of the battery, and the reserve cell 14 will have its electrode 46 at the bottom of the battery covered by the terminal spacer conductor means 18 with contact electrode 46 spaced away from the material of the terminal spacer conductor means 18 since it is positioned within the space defined by wall 54 and end or bottom 56.

Thus, when a pair of batteries such as batteries 10 and 10a are placed in a flashlight 60, bulb end 62 will contact contact terminal 40 of the upper battery 10, and wall or bottom 56 of battery 10 will contact terminal electrode 40 of lower battery 10a, and element 56 of battery 10a will contact the usual spring contact 66 of the flashlight. By means of the flashlight's construction, including a switching mechanism, the circuit will be closed between contact 66 and rim 68 of the bulb 70.

Referring now to FIG. 4 of the drawings, spacer conductor means 18 provides electrical connection by conducting the current between its contact terminal 40 and its end or bottom 56 by providing an electrical pathway by reason of the material of conductor spacer means 18 and casing 60, the materials of these elements being electrical conductors. The reserve cell 14 is not in the circuit at this time because one of its electrodes 46 is kept out of contact as described hereinabove because of the formation of the spacer means 18 and the insulation material at reference numerals 32.

When the cells 12 of batteries 10 and 10a are exhausted, the batteries may be removed from the flashlight or other device and inverted as shown in FIG. 4 of the drawings. The cells 12 and 14 are then pushed upwardly within the perimeter material 20, sliding and ejecting the spacer conductor means as shown in dotted line in FIG. 5. The spacer conductor means 18 is then placed below the inverted battery 10 and pushed up into the opening 72 to reconstitute the battery 10 with reserve cell 14 and its contact terminal electrode 46 now extended in upper position. The inverted battery is thus constituted and is placed into the flashlight providing fresh reserve cells 14 in the active part of the circuit in place of the spent cells 12 which are now in the reserve position as shown in FIG. 5.

It is to be understood that while the invention has been illustrated with a standard cylindrical cell shape for the battery, it may take any shape of standard battery, whether cylindrical, oblong, flat or square and it is further to be understood that while the construction herein has been illustrated in a preferred form with an insulating perimeter material 20, the principles of the invention can be utilized in any type of battery construction. For example, a terminal spacer conductor means can be made in the form of a cap closure which can be screwed or held in place over an extended contact terminal such as either terminal 40 or 46, and the insulation means for the battery can be provided in any other way known to the art. Thus, while we have described our invention in its preferred forms, there are other forms which it may take without departing from the spirit and scope of the invention, and we, therefore, desire to be protected for all forms coming within the claims hereinbelow.

Wherefore we claim:

1. An electric battery in a standard size and shape of a standard cell comprising at least one active cell and at least one reserve cell and terminal spacer conductor means and means to hold said set of cells and terminal spacer conductor means selectively together, said cells being positioned in contacting relationship with a contact terminal electrode of each cell extending in opposite directions in said standard battery size and shape, each of said cells comprising a cell wall portion and a contact terminal electrode extending outwardly from said cell, said cell wall portion comprising an electrode of opposite polarity to said contact terminal electrode, and said terminal spacer conductor means comprising at least one wall being adapted to be seated in electrical connection against said wall portion electrode of the reserve cell with the contact terminal electrode of the reserve cell spaced inside said spacer conductor means wall in a non-contacting relationship.

2. The electric battery as defined in claim 1, in which the means holding a set of cells and terminal spacer conductor means selectively together is a perimeter material within which the said cells and the said terminal spacer conductor means are selectively fitted together.

3. The electric battery as defined in claim 2, in which the perimeter material has the properties of being an electrical insulator.

4. The electric battery as defined in claim 3, in which a set of cells are comprised in a single casing comprising at least one side wall, and comprising a pair of contact terminal electrodes extending outwardly from said casing in opposite directions, and the said terminal spacer conductor means comprises at least one side wall and an end wall, said side wall being in longitudinal alignment with said cell casing side wall when the elements are fitted together within said perimeter material.

5. The electric battery as defined in claim 4, in which the said set of cells are separate cells positioned bottom to bottom.

References Cited

UNITED STATES PATENTS

| 1,277,042 | 8/1918 | Burgess | 136—110 |
| 2,231,320 | 2/1941 | Burgess | 136—130 |
| 2,886,623 | 5/1959 | Lehr | 136—173 |

WINSTON A. DOUGLAS, Primary Examiner

A. SKAPARS, Assistant Examiner

U.S. Cl. X.R.

136—107, 135, 173